Figure 1:
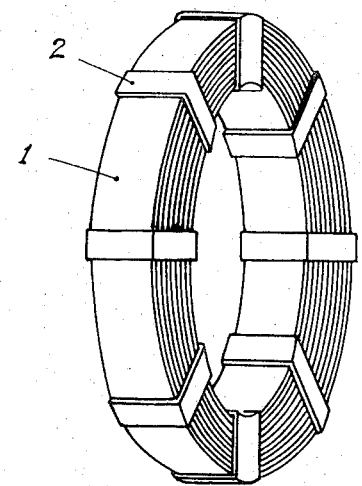

United States Patent [19]
Champleboux et al.

[11] 3,822,870
[45] July 9, 1974

[54] REINFORCING MEMBERS FOR RUBBER ARTICLES

[76] Inventors: Jacques Champleboux, 36 rue de Tremoneix; Robert Delaux, 1442 rue Auguste, both of 63 Clermont-Ferrand, France

[22] Filed: May 25, 1972

[21] Appl. No.: 256,759

[30] Foreign Application Priority Data
May 26, 1971 France .............................. 71.19179
May 27, 1971 France .............................. 71.19409
Nov. 12, 1971 France .............................. 71.40703

[52] U.S. Cl. .............................................. 267/152
[51] Int. Cl. ............................................ F16f 3/10
[58] Field of Search ............. 267/30, 152, 153, 140, 267/141

[56] References Cited
UNITED STATES PATENTS
1,661,220  3/1928  Geyer .................................. 267/30
3,467,353  9/1969  Peterson et al. ..................... 267/152
3,544,176  12/1970  Slater ................................ 267/152

*Primary Examiner*—James B. Marbert
*Attorney, Agent, or Firm*—Brisebois & Kruger

[57] ABSTRACT

A reinforcing member for a rubber article in the form of a ring or hollow sleeve comprises a flexible hoop made from a thin and elastic strip of sheet metal wound into a spiral of several convolutions which latter are superimposed and held solidly together to form an annular member capable of being elastically deformed under flexion when stressed by a load applied perpendicularly to the axis of the coil. The invention also relates to articles such as shock-absorbers, particularly marine buffers, and hoses for pumping fluids, and reinforced by such reinforcing members.

15 Claims, 15 Drawing Figures

REINFORCING MEMBERS FOR RUBBER ARTICLES

The present invention relates to re-inforcing members for rubber articles having the general form of a ring or a hollow sleeve intended to work in flexion to support or cushion loads exerted perpendicularly to their longitudinal axis, and also to rubber articles including such re-inforcing members. It is an object of the invention to improve such members and articles as hitherto known and to avoid or minimise the drawbacks thereof.

According to the invention this new re-inforcing member consists of a flexible hoop formed from a thin and elastic strip of sheet metal wound in a spiral with several convolutions laid one upon another and held solidly together to form an annular member capable of elastic deformation under flexion when stressed by a load exerted perpendicularly to the axis of winding.

The superimposed convolutions of the spirally wound strip, may be held together by means of clips distributed around the periphery of the hoop. Two, or a plurality, of hoops of the same diameter may be placed together side by side and their convolutions are then held solidly together by common clips coupling adjacent hoops together. The superimposed convolutions may also be held solidly together by a thin layer of rubber interposed between the convolutions and adhering to the metal of the strip. The two foregoing means may be used in conjunction.

The invention also consists in a rubber article in the form of a ring or a hollow sleeve arranged for operation under flexion to support a load directed perpendicularly to its longitudinal axis, wherein the rubber article is reinforced by one or more flexible annular reinforcing members according to the invention, these members being embedded in the rubber body and being oriented along the plane perpendicular to the axis of the article.

Such a rubber article in the form of a ring or a hollow sleeve may be used as an elastic support for a load or as a shock-absorbing device, for example, for berthing bumpers used to protect both ships and fixed harbour installations such as quays against berthing impacts and against the strains resulting from the movements of moored ships. In this type of application the thickness of the wall of the rubber body of the article may be less than 25 percent of the external diameter of this wall. In fact, due to the elastic annular members which give the sleeve the main part of its resistance to crushing, the rubber walls of the sleeve may be relatively thin so that the whole is capable of considerable elastic deformation prior to complete crushing. It is thus possible to produce shock-absorbers which are lighter and cheaper having regard to the shock-load to be absorbed to protect ships and harbour installations.

A rubber article in the shape of a tubular sleeve reinforced by flexible annular members according to the invention may also form a flexible hose for pumping liquids. In this case the rubber body of the hose includes, besides flexible annular members longitudinally spaced, at least two adjacent reinforcing layers formed from cables wound helically in opposite directions at an angle of approximately 55 percent to the generating lines of the hose.

In this field the invention is particularly interesting for flexible hoses of large diameter, i.e., 200 mm and above, used to convey liquid products or solid products in suspension in a fluid. It is particularly intended for hoses used for pumping petroleum products when tankers are being loaded or unloaded, although it may also be applied to hoses intended for other uses.

In use, flexible hoses of this type have to withstand fairly high pumping pressures of the order of eight to 12 bars and when being handled they may be subjected to external loads liable to crush them. Thus, as the hose is being connected to the ship or to the pumping station, the hose, not yet subject to internal delivery pressure, may be partially submerged and thus subjected to a considerable external pressure tending to flatten it. These hoses are also liable to be subjected to external impacts tending to crush them.

It is known to reinforce flexible rubber hoses by means of woven materials or textile or metal cables to give them the desired resistance to the internal pumping pressure of the fluid transported. These reinforcements are arranged within the wall of the hose to operate mainly in tension. But the reinforcements are ill adapted to withstand external pressures or impacts which cause them to operate in flexion and in compression. It has thus been necessary to produce hoses in which the reinforcement resisting the internal pressure is complemented by a reinforcement resistant to crushing and generally formed by a metallic cable helically coiled at a large angle (70° to 80°) to the generating lines of the hose and embedded in the wall of the hose. However, it has been established that this helical reinforcement tends to deform permanently and to break locally when the hose is subjected to crushing loads sufficient to flatten it completely. In this case the hose breaks and becomes unusable. Further, this helical core stiffens the tube longitudinally and increases the minimum radius of curvature beyond which the hose cannot be bent without the risk of permanent deformation and breakage.

The use of flexible annular reinforcing members according to the invention allows these drawbacks to be avoided or minimised and consequently flexible pumping hoses to be produced which withstand not only the internal pressure of the fluid transported but also the external pressure and strains tending to crush them. In fact, these annular reinforcing members withstand external strains tending to crush the tube while still preserving the ability, if the curshing load is high, to accept very considerably elastic deformation and then to ensure the elastic restoration of the hose to its initial cylindrical shape. Further, due to the fact that they are annular and spaced apart, they only slightly increase the longitudinal stiffness of the hose which may be bent in all directions to a very small radius with regard to its diameter.

Figure 2:
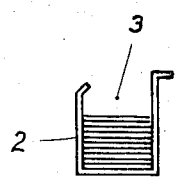
Figure 3:
Figure 4:
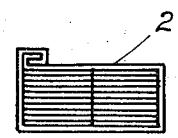
Figure 5:
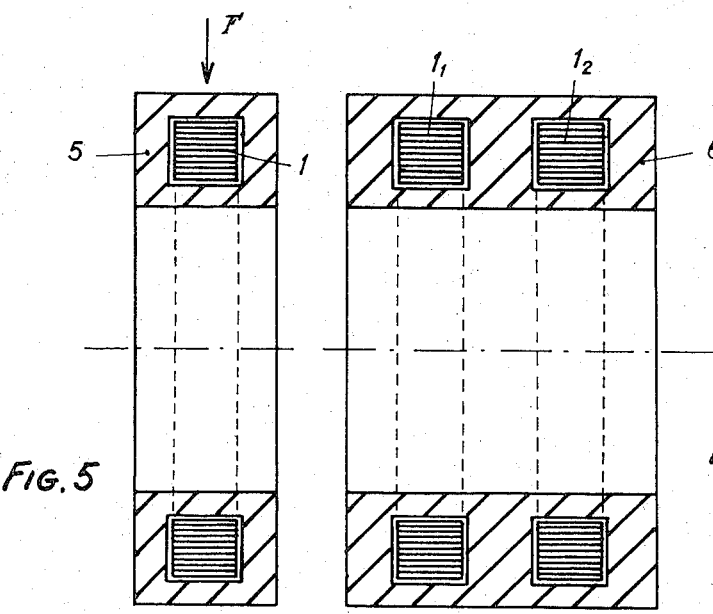
Figure 6:
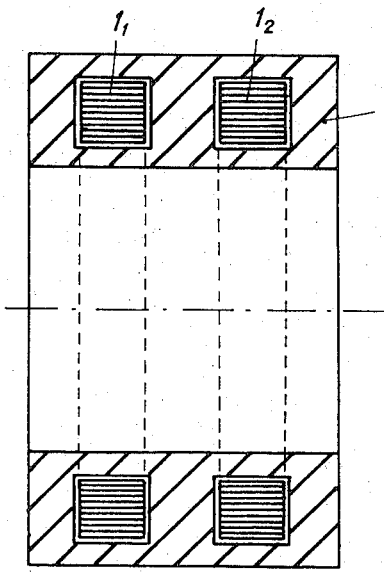
Figure 7:
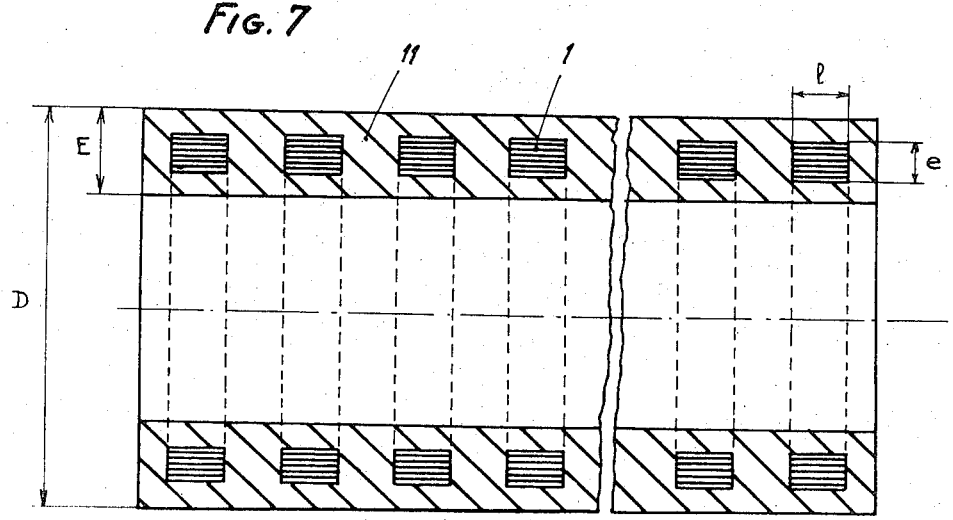
Figure 8:
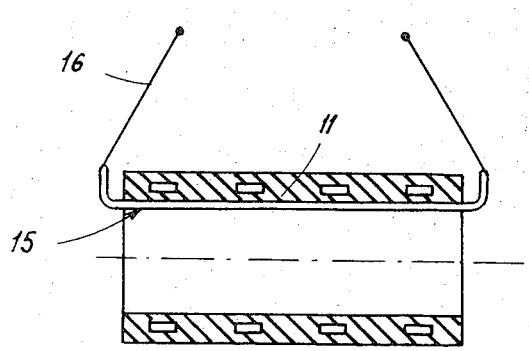
Figure 9:
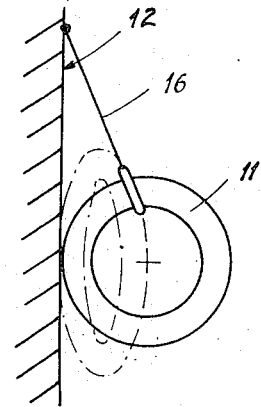
Figure 12:
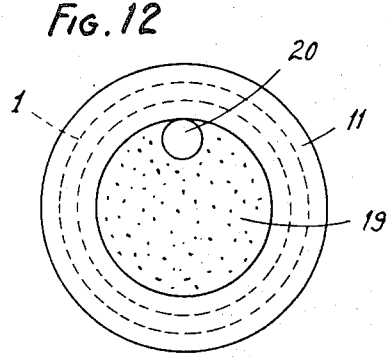
Figure 13:
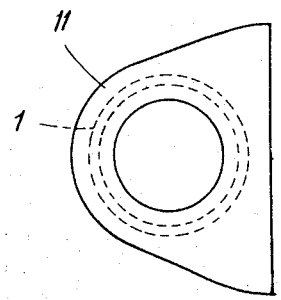
Figure 14:
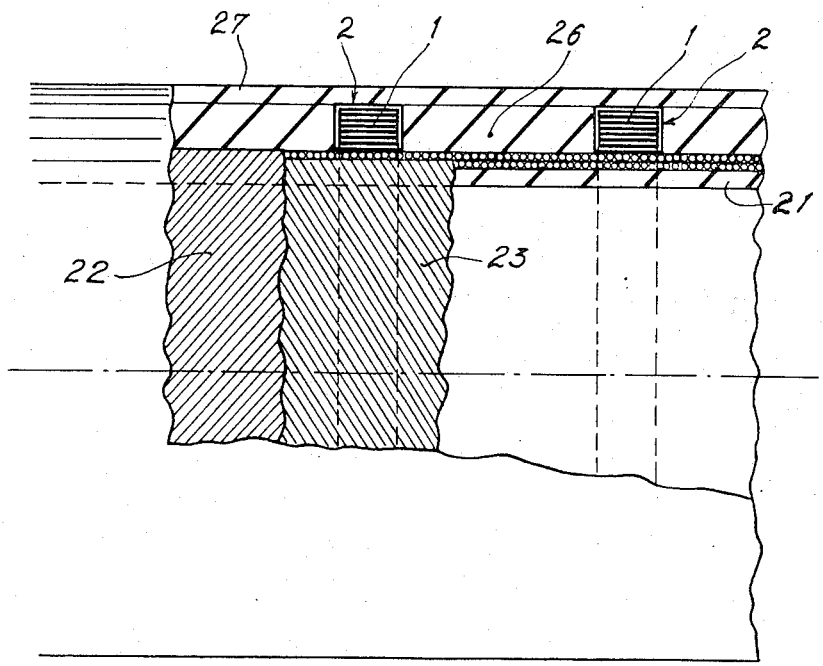
Figure 15:
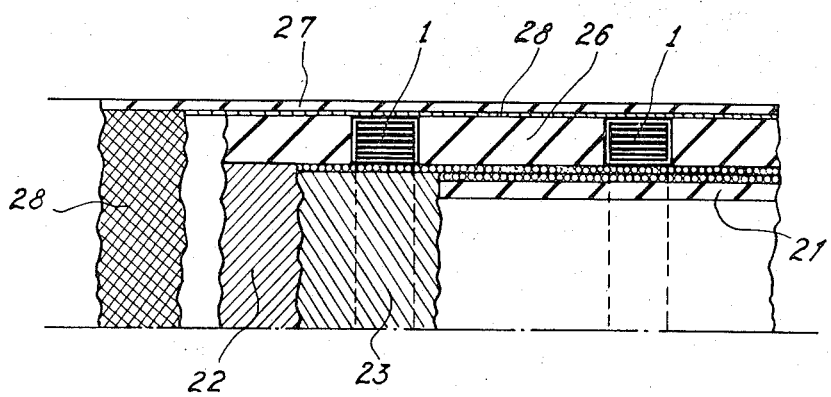

In order that the invention may be more clearly understood reference will now be made to the accompanying drawings which show some embodiments thereof by way of example and in which:

FIG. 1 shows a perspective view of a reinforcing member in the form of a flexible hoop, FIGS. 2 and 3 show sectional views of a hoop formed from a strip at two stages of manufacture respectively, FIG. 4 shows a sectional view of a modification formed from two adjacent hoops, FIGS. 5 and 6 show in section two rubber articles reinforced by flexible reinforcing members according to the invention, FIG. 7 shows a sectional elevation of a shock-absorber sleeve for ship-berthing protection, FIGS. 8 and 9 shows schematic views illustrating the use of this sleeve of FIG. 7, FIGS. 10, 11, 12 and 13 show views of modifications of this shock-absorber device, and FIGS. 14 and 15 show sectional elevations of parts of flexible pumping hoses with certain portions removed to show how they are formed.

Referring now to the drawings, FIG. 1 shows a core member comprising a flexible hoop 1 formed from a thin and elastic strip of steel, e.g., spring steel or steel strip, wound in a spiral of several convolutions to achieve the desired thickness. The successive convolutions of this winding are held together by metallic clips 2 distributed at regular intervals around the periphery of the hoop and orientated along the radial plane with respect to the axis of the coil. These clips prevent the convolutions from moving apart radially and sliding axially with respect to each other.

The hoop so formed my be obtained by winding the steel strip in the open clips (FIG. 2) laid out on the circumference of a mandrel corresponding to the interior diameter of the hoop. These clips 2 are then shaped to a U with their opening 3 directed outwards. The lateral walls of each clips, separated by a distance equal to the width of the strip, serve as guides for the latter as it is being wound, such that the convolutions are exactly superimposed. When an adequate number of convolutions has been attained the clips 2 are shaped, for example by crimping their ends as shown in FIG. 3.

FIG. 4 shows how flexible hoops of greater axial width may be obtained by placing two basic hoops next to one another, these being held together by means of common clips 2 laid out around the periphery. A large number of basic hoops lying next to one another may thus be assembled and these basic hoops may or may not be equipped individually with clips clamping the convolutions of their coils.

The clamping of the superimposed convolutions of the wound-up band of strip steel may also be achieved by other means, in particular by fixing the successive convolutions by means of a thin layer of rubber interposed between them and adhering strongly to the metal after vulcanisation of the rubber. This means may be used simultaneously with the clips described above, it then being possible to reduce the number of clips.

The flexible loops 1 thus formed are used, according to the invention, as reinforcing members for objects made of rubber in the form of rings and sleeves intended to operate under flexion to support or cushion loads directed perpendicularly to the axis of the coil and tending in consequence to flatten or make the articles oval. FIGS. 5 and 6 show respectively a ring 5 comprising a rubber body in which is embedded a flexible reinforcing hoop 1 and a tubular rubber and a tubular rubber sleeve 6, reinforced by means of two such flexible hoops referred to at $l_1 - l_2$. Depending on the axial length of the sleeve 6 there may be a larger number of hoops 1 and these may be more or less spread out, according to their degree of flexibility, to give the sleeve the desired resistance to flexion. It should be noted that rings such as that in FIG. 5 may be obtained by cutting up a sleeve of great axial length. The articles thus obtained possess the property of very great flexibility, i.e., of being able to accept very high deformations, the reinforcement and the rubber body co-operating in elastic restoration after deformation.

These reinforced rubber articles may be used in various applications such, for example, as forming elastic supports for static or mobile loads, these being subjected, for example, to vibration or shaking. They may be incorporated in vehicle or machinery suspensions.

Although it was envisaged in the foregoing that the annular flexible hoops and the rubber articles reinforced by means of these hoops be of circular shape, it is also possible to depart from this form and product flexible hoops of non-circular shape, for example, elliptical or oblong.

FIG. 7 shows in sectional elevation a shock-absorber device able to be used as a berthing bumper for ships. This device consists of a tubular rubber sleeve 11 of generally cylindrical form reinforced by elastic annular members of metal such as 1 embedded in the wall of this sleeve.

These members 1 are orientated along planes perpendicular to the axis of the sleeve and are suitably spaced apart and distributed along the whole length of the sleeve. The members 1 are of rectangular cross-section with an axial width $l$ greater than their radial thickness $e$. These members are each made up of a strip of elastic steel such as spring-steel or steel strip, several turns of which are wound in a spiral to attain the thickness $e$. The convolutions of this coil are fixed by means of metal clips 2 as referred to in connection with FIG. 1, distributed at regular intervals to prevent them separating radially and sliding axially with respect to each other.

The shock-absorber member thus obtained may be used as a berthing bumper in the form of a buffer, that is to say with the conventional attachment devices for this type of protection. FIGS. 8 and 9, for example, show a sleeve carried by a metal rod 15 hung on chains 16 along the vertical wall 12 of a quay requiring protection. The shock-absorber member may also be used in more elaborate berthing protection installations and in particularly in those which include protective panels or shields placed in front of the shock-absorber sleeves.

When effected by an impact which is frontal or has a component at right angles to the bearing surface 12, the shock-absorber sleeve deforms into an oval shape as shown in FIG. 9, i.e., by making its lateral walls work in flexion to cushion the impact. This flexion of the lateral walls is resisted mainly by the annular steel members 1 and for the rest by the rubber itself. Due to the greater individual stiffness of the members 1 by contrast with that of the rubber the desired total resistance of the sleeve to crushing may be achieved by having a relatively small wall thickness E for the sleeve, i.e., less than 25 percent of the external diameter D of the sleeve (see also FIG. 7). The cushioning travel of the sleeve as a result of flexure of its walls before complete crushing may thus be relatively greater than with a buffer entirely of rubber designed to cushion the same loads. With this reduced thickness of the walls of the sleeve and in spite of the weight of the metal members 1, the complete sleeve may be lighter and less costly than a conventional buffer. On the other hand, for the same sleeve thickness it is possible, at manufacture, to vary the resistance to the shock-absorber easily by varying the number and or the axial dimension $l$ of the rings 1. Finally, from a shock-absorber sleeve made of great length, sleeve sections of smaller lengths can be cut off between the rings 1 to meet the requirements of the various installations to be produced.

Figure 10:
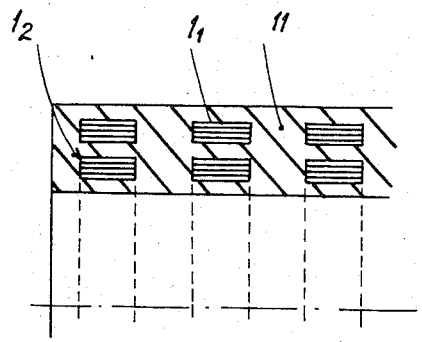

FIG. 10 shows a modification of the shock-absorber just described in which the elastic members 1 are each made up of two concentric rings $1_1 - 1_2$ of flatter rectangular cross-section, separated by an intermediate layer of rubber of greater or less thickness.

Figure 11:
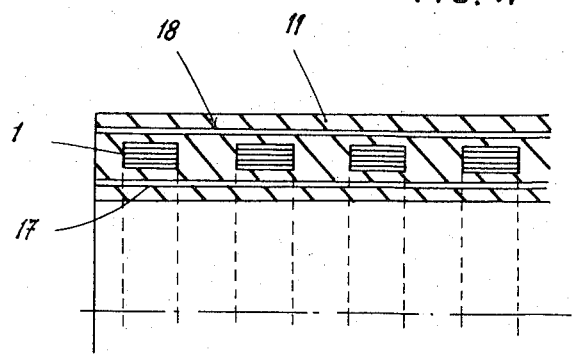

FIG. 11 shows another modification in which the rubber sleeve is additionally reinforced by two reinforcing layers 17 - 18 arranged inwardly and outwardly with respect to the elastic rings 1. These layers are made up, for example, of woven material or of textile or metal cords orientated longitudinally or obliquely. They may each form a single layer or a coil of several convolutions. It would also be possible to have only one of the reinforcements 17 or 18. The effect of these reinforcements is to ensure a better longitudinal connection between the successive rings 1 and thus to give a better resistance to oblique and longitudinal strains due, for example, to the longitudinal rubbing of the ship for example, and which would tend to deform the rings by squashing them obliquely. By using layers of metal cords forming an angle close to 90° with respect to the generating lines (70° to 85° for example) for layers 17 or 18, the resistance to crushing of the sleeve may be increased.

FIG. 12 shows another modification in which the space within the sleeve is filled with a cellular material 19 which may be introduced after the manufacture of the sleeve and which may be moulded in-situ in the interior space. This cellular material may have cells formed to ensure the buoyancy of the complete sleeve or may have open cells. In both cases this material gives an extra cushioning effect without undesirable stiffness which could give rise to excessive kick-back. A passage 20 may be kept free at an appropriate point for the passage of a suspension chain or rod.

FIG. 13 shows another shock-absorber sleeve having a generally triangular cross-section with a rounded apex and a flat supporting base. This sleeve has a cylindrical passage and is reinforced by elastic rings 11 concentric with the axis of the passage.

Many other modifications of shock-absorbing sleeves may easily be deduced from the examples described above.

FIGS. 14 and 15 shows the application of the flexible annular members in FIG. 1 for reinforcing resilient hoses useful for pumping fluids.

In the case of FIG. 14 the hose comprises, from the inside outwards:

a. an interior tube 21 of a rubber suitable for the use to which the hose is put;

b. two superimposed reinforcing layers 22 and 23 made of metal cables and inclined in different directions from one layer to the other and forming an angle of approximately 55° with respect to the generating lines of the hose. These two crossed layers form a reinforcement which resists the internal pressure of the fluid transported in the hose;

c. annular reinforcing members 1 spaced apart longitudinally and orientated along planes perpendicular to the axis of the hose. These annular members 1 are similarly formed to that in FIG 1, by means of a thin metal strip wound in a spiral, the convolutions being held together by metal clips 2 distributed around the periphery of the members 1. These members 1 withstand the strains tending to crush the hose but they still possess a considerable capacity for elastic deformation. The interval between the rings in the longitudinal direction is selected to give the hose the desired resistance to exterior strains resulting from the pressures and impacts to which it may be subjected and the gaps between these rings are filled with rubber 26;

d. finally, an exterior sheath or cladding 27 of suitable rubber.

The hose shown in FIG. 15 is made up in the same way as that in FIG. 14 but it also includes a protective layer 28, which may be of textile or metallic nature and whose function is to protect the body of the hose against wear, cuts etc. . . and which, in addition, ensures a certain longitudinal connection between the spaced annular members 1. This protective layer 28 may, for example, be of cross-ply material of which the threads are placed at 45° with respect to the longitudinal axis.

Other modifications may be deduced from the examples described above. The pressure-resistant layers 22 - 23 may be replaced by two or more pairs of corresponding layers, in particularly in the case of very large hoses. Similarly, the individual annular members 1 may be replaced by juxtaposed pairs of similar rings, held together if necessary, by common clips as illustrated in FIG. 4.

We claim:

1. An article comprising a rubber member which is annular in cross-section and which is elastically deformable to support a load directed perpendicularly to its axis and at least one annular reinforcing member which is embedded in said rubber member to encircle the axis thereof and which is elastically deformable in the direction perpendicular to its axis said reinforcing member comprising at least one hoop made from a thin and flexible strip of sheet metal wound in a flat spiral of several convolutions, said convolutions being superimposed and held solidly one to another whereby when the article is stressed by a load exerted perpendicularly to the axis of the hoop, both said hoop and said rubber member are elastically deformed.

2. An article according to claim 1, wherein the superimposed convolutions of the spirally wound strip are held solidly together by means of clips distributed around the periphery of the hoop.

3. An article according to claim 2, in which said annular reinforcing member comprises a plurality of hoops of the same diameter which are juxtaposed and held solidly together by common clips distributed around the periphery of the member.

4. An article according to claim 1, wherein the superimposed convolutions of the spirally wound strip are held solidly together by means of a thin layer of rubber interposed between the convolutions and adhering to the metal of the strip.

5. An article according to claim 1 wherein the rubber member is in the form of a sleeve and said article comprises a plurality of such annular reinforcing members which are spaced apart in the longitudinal direction of the sleeve.

6. An article according to claim 5 wherein the annular reinforcing members are arranged in concentric pairs.

7. An article according to claim 5 wherein at least one reinforcing layer of cords is embedded in the wall of the sleeve, said cords being orientated at an angle to the generating lines of the sleeve.

8. An article according to claim 7, and including two reinforcing layers embedded in the wall of the sleeve and radially spaced apart and between which said annular reinforcing members are arranged.

9. An article according to claim 5 and forming a shock absorbing device, the thickness of the wall of the sleeve exposed to impacts being less than 25 percent of the external diameter of said wall.

10. An article according to claim 9, wherein the interior of said sleeve is at least partly taken up by a cellular material.

11. An article according to claim 5 wherein the sleeve comprises reinforcing layers made up of obliquely orientated cords, said article forming a flexible hose for pumping liquids, said reinforcing layers being formed from at least two adjacent layers made up of cords helically wound in different directions at an angle of approximately 55° with respect to the generating lines of said hose whereby to resist internal pressure within the hose.

12. An article according to claim 11, wherein the annular reinforcing members are placed outside the two superimposed layers of cords resisting the internal pressure.

13. An article according to claim 12, and including at least one additional protective layer embedded in the wall of said hose and situated externally of said annular reinforcing members.

14. A reinforcing member for a rubber article of annular cross-section and elastically deformable to support a load directed perpendicularly to its axis, said reinforcing member being of annular form and comprising at least one hoop which is elastically deformable in the direction perpendicular to its axis and which is made from a thin and flexible strip of sheet metal wound in a flat spiral of several convolutions, said convolutions being superimposed and held solidly one to another by means of clips distributed around the periphery of the hoop, whereby when the hoop is stressed by a load exerted perpendicularly to its axis, said hoop is elastically deformed.

15. A reinforcing member according to claim 14 and comprising a plurality of hoops of the same diameter which are juxtaposed and held solidly together by common clips distributed around the periphery of the member.

* * * * *

UNITED STATES PATENT OFFICE
CERTIFICATE OF CORRECTION

Patent No. 3,822,870         Dated July 9, 1974

Inventor(s) JACQUES CHAMPLEBOUX and ROBERT DELAUX

It is certified that error appears in the above-identified patent and that said Letters Patent are hereby corrected as shown below:

[73] Assignee: Pneumatiques, Caoutchouc Manufacture et Plastiques Kleber-Colombes, Colombes, France Signed and sealed this 15th day of July 1975.

(SEAL)
Attest:

RUTH C. MASON
Attesting Officer

C. MARSHALL DANN
Commissioner of Patents
and Trademarks